United States Patent [19]
Défago et al.

[11] Patent Number: 4,585,820
[45] Date of Patent: Apr. 29, 1986

[54] MIXTURES OF A POLYACRYLIC ACID AND A COPOLYMER OF ACRYLIC ACID AND ACRYLAMIDE AS THICKENERS IN PRINTING PASTES FOR DYEING AND PRINTING FIBRE MATERIAL

[75] Inventors: Raymond Défago, Riehen, Switzerland; Wolfgang Sütterlin, Lörrach-Haagen, Fed. Rep. of Germany

[73] Assignee: Ciba-Geigy Corporation, Ardsley, N.Y.

[21] Appl. No.: 739,498

[22] Filed: May 30, 1985

Related U.S. Application Data

[63] Continuation of Ser. No. 430,640, Sep. 30, 1982, abandoned.

[30] Foreign Application Priority Data

Oct. 9, 1981 [CH] Switzerland ................ 6477/81

[51] Int. Cl.[4] .............. C08L 33/00; C08L 33/26; C09D 7/00
[52] U.S. Cl. .................... 524/232; 524/306; 524/308; 524/521; 525/218; 525/221
[58] Field of Search .............. 525/221, 218; 524/503, 524/521, 232, 306, 308, 522

[56] References Cited

U.S. PATENT DOCUMENTS

| | | | |
|---|---|---|---|
| 3,079,356 | 2/1963 | Oda et al. | 524/503 |
| 3,996,181 | 12/1976 | Hayashi et al. | 524/503 |
| 4,036,587 | 7/1977 | Wolf et al. | 8/92 |
| 4,331,572 | 5/1982 | Tomasi et al. | 524/238 |

FOREIGN PATENT DOCUMENTS

| | | |
|---|---|---|
| 0042678 | 12/1981 | European Pat. Off. . |
| 2744395 | 1/1979 | Fed. Rep. of Germany . |
| 800735 | 9/1958 | United Kingdom . |
| 871193 | 6/1961 | United Kingdom . |
| 2007238 | 5/1979 | United Kingdom . |
| 2010928 | 7/1979 | United Kingdom . |
| 2017159 | 10/1979 | United Kingdom . |
| 2077750 | 12/1981 | United Kingdom . |

OTHER PUBLICATIONS

Chemical Abstracts, vol. 92, p. 70 (1980), No. 95637z, Mizutani et al.
Chemical Abstracts, vol. 81, No. 22, p. 66 (1974) 137513m, Terao et al.
Chemical Abstracts, vol. 84, p. 78 (1976) 6404r, Yoda et al.
Chemical Abstracts, vol. 80, p. 18 (1974) 146774d, Kurata et al.

Primary Examiner—Allan M. Lieberman
Attorney, Agent, or Firm—Edward McC. Roberts; Kevin T. Mansfield

[57] ABSTRACT

The invention relates to a structurally viscous thickener which contains a copolymer of acrylic acid and acrylamide, a polyacrylic acid and optionally a solvent, emulsifiers, a neutralizing agent and a deaerator as additional components. The thickener may be in the form of a water-in-oil emulsion and is particularly suitable for use in printing pastes for dyeing and printing fibre material, especially textile fabrics.

4 Claims, No Drawings

MIXTURES OF A POLYACRYLIC ACID AND A COPOLYMER OF ACRYLIC ACID AND ACRYLAMIDE AS THICKENERS IN PRINTING PASTES FOR DYEING AND PRINTING FIBRE MATERIAL

This application is a continuation of application Ser. No. 430,640, filed Sept. 30, 1982, now abandoned.

The dyeing and printing of fibre materials makes exacting demands of the rheological properties of printing pastes, which are often subjected to severe shear forces in modern printing machines. It is therefore expedient to use in particular structurally viscous printing pastes, the viscosity of which decreases under the influence of shear forces, i.e. printing pastes which revert to their original viscosity as soon as the action of the shear forces ceases. Such structurally viscous printing pastes have a relatively low flow index, i.e. they flow readily under the influence of shear forces and disperse uniformly e.g. in the screens of rotary screen printing machines. In addition, they can be readily stirred and pumped. The structurally viscous printing pastes employed up to now usually contain homopolymers based on acrylic acid. However, these known printing pastes have the drawback that a permanent loss of viscosity may occur when they are exposed to severe long acting shear forces.

It is the object of the present invention to provide printing pastes which are particularly resistant to the severe long acting shear forces encountered in modern printing machines. Surprisingly, this object is accomplished by using as thickener in the printing paste a copolymer of acrylic acid and acrylamide in addition to a polyacrylic acid.

Accordingly, the present invention relates to a thickener which comprises
(A) a copolymer of acrylic acid and acrylamide and
(B) a polyacrylic acid.

The use of the thickener in printing pastes for dyeing and printing fibre materials, the application process for dyeing and printing said materials, the printing paste for carrying out the application process, and the fibre material which is dyed and printed by said process, constitute further objects of the invention. If the fibre material is treated by the transfer printing process, the printed supports employed also fall within the province of the invention.

Component (A) of the thickener of the present invention is in particular a copolymer of high molecular weight which has a molar ratio of acrylic acid to acrylamide of 1:0.9 to 1:1.1 and a molecular weight in the region of $10^6$, e.g. of $1 \cdot 10^6$ to $6 \cdot 10^6$, preferably of $2 \cdot 10^6$, to $3 \cdot 10^6$, said copolymer as active ingredient of component (A) advantageously being structurally viscous in aqueous medium, i.e. by addition of water. Such copolymers of the indicated kind are usually at least partially crosslinked and accordingly contain mainly branched chains.

Such copolymers are prepared by methods which are known per se by copolymerising preferably equimolar amounts of acrylic acid and acrylamide usually in aqueous medium. It is advantageous to initiate the copolymerisation reaction at room temperature, e.g. 20° C., and to continue it at gradually increasing temperatures up to about 60° C. In addition, it may be convenient to use stabilisers and boosters in the copolymerisation, e.g. persulfates, pyrosulfites and peroxides, as well as usually crosslinking agents, e.g. compounds containing olefinic double bonds, preferably vinyl or allyl compounds, in particular triallyl isocyanurate.

Such copolymers are known per se and are described e.g. in European patent application 42 678.

Component (B) which is contained in the thickener in admixture with component (A), is a polyacrylic acid having a molecular weight of $6 \cdot 10^5$ to $1 \cdot 10^6$, in particular 7 to $9 \cdot 10^5$.

The polyacrylic acid employed as preferred component (B) is one which contains mainly linear chains and is advantageously also structurally viscous in aqueous medium, i.e. by addition of water. A typical polyacrylic acid of the indicated kind is CARBOPOL 820 ®, commercially available from the Goodrich Chemical Corporation.

In its preferred embodiment, the thickener of this invention contains the copolymer (A) and the polyacrylic acid (B) in the ratio of (A) to (B) of 0.15 to 30:1, preferably 0.15:1 to 15:1, and most preferably 5:1 to 8.1.

The thickener will normally be in the form of an aqueous-organic, structurally viscous water-in-oil emulsion which, in addition to containing the polymers (A) and (B), contains a water-insoluble solvent, emulsifiers, a neutralising agent and optionally a deaerator or antifoam.

After they have been mixed with water in the ratio 1:10 to 1.20, the thickener emulsions containing neutralising agents have a pH of 5.8 to 9. If the printing paste is used for dyeing and printing fibre materials by direct printing, the preferred pH range of the printing paste is from 5.8 to 6.9, in particular from 6 to 6.8. If used for transfer printing, however, the preferred pH range of the printing paste is from 6 to 9, in particular from 6.5 to 8.

Suitable solvents for the oil phase are preferably hydrocarbons, e.g. technical white spirit or technical paraffin oils, especially the commercially available paraffin oils (e.g. ISOPAR ® brands available from ESSO). Such solvents normally have a flash point above about 30° C., preferably from 50° to 100° C., a boiling range from about 160° to 220° C., and an average molecular weight in the range from about 150 to 180.

As emulsifiers it is particularly convenient to use a water-in-oil emulsifier in admixture with an oil-in-water emulsifier in order to obtain storage stable water-in-oil thickener emulsions. Suitable oil-in-water emulsifiers are e.g. alkanolamides of high molecular fatty acids, especially ethanolamides of unsaturated or preferably saturated fatty acids containing 12 to 22, preferably 12 to 18, carbon atoms, such as linoleic acid, linolenic acid, oleic acid, lauric acid, palmitic acid and stearic acid, preferably in the form of their technical mixtures; alkylene oxide adducts, preferably ethylene oxide adducts, of fatty alcohols which are derived from the fatty acids referred to above, e.g. adducts of oleyl alcohol and ethylene oxide, alkylene oxide adducts, preferably ethylene oxide adducts, of esters of polyalcohols such as pentaerythritol or sorbitol or anhydrosorbitols and the fatty acids of the indicated kind, in particular adducts of ethylene oxide and sorbitan fatty acid esters. As water-in-oil emulsifiers it is preferred to use the above described esters of polyalcohols and fatty acids, e.g. sorbitan fatty acid esters.

Suitable neutralising agents are ammonia, preferably as aqueous solution, alkanolamines, i.e. mono-, di- and tri-alkanolamines each containing 1 to 4, preferably 2 or 3, carbon atoms in the alkanol moiety, e.g. triethanolamine, and, in particular, alkali metal hydroxides such as potassium hydroxide and, especially, sodium hydroxide, preferably in the form of their aqueous solutions. If desired, the thickener may additionally contain a deaerator or antifoam.

In principle, all commercially available antifoams or deaerators may be used as optional component of the thickener employed in this invention, provided they do not have any significant ionic character which would impair the desired rheological properties of the thickener. Accordingly, for example, non-ionic commercially available silicone oils or silicone oil emulsions are suitable. Although silicone oil emulsions have good antifoaming properties, they have only poor deaerating properties. It is therefore preferred to use as component (C) deaerators which have a low content of silicone oil or contain no silicone oil, and which contain in general from 0 to 10% by weight, preferably from 2 to 8% by weight, of a conventional silicone oil.

Preferred deaerators contain as active ingredient e.g. high boiling hydrocarbons, hydrogenated naphthalenes, mineral oils, fatty oils or insoluble metal soaps or mixtures thereof, and may contain the previously indicated amount of silicone oil emulsions. They may also, however, be in the form of aqueous solutions which contain as a rule, in addition to the active ingredients of the indicated kind, a non-ionic surfactant, e.g. an adduct of ethylene oxide and an alkyl phenol. Preferred active ingredients of the deaerators are higher alcohols with boiling ranges above 100° C., high boiling terpentine oils, mineral oils or mixtures thereof. As optional component of the thickener it is preferred to use a mixture of hydrocarbons which in general has a flash point above 120° C., preferably in the range from 150° to 220° C., and a boiling range from about 250° to 500° C. (under normal conditions, or up to at most about 300° C. under reduced pressure).

Particularly storage stable, structurally viscous water-in-oil thickener emulsions comprise 15 to 30% by weight of polymers (A) and (B),
10 to 30% by weight of paraffin oil,
3 to 15% by weight of ethanolamides of fatty acids as well as sorbitan fatty esters and adducts thereof with ethylene oxide,
5 to 10% by weight of a 25% to 35% aqueous solution of sodium hydroxide,
0 to 2% by weight of at least one high boiling hydrocarbon of the indicated kind as deaerator, and
10 to 70% by weight, preferably 13 to 67% by weight, of water.

When used in printing pastes, the thickeners of the invention are mixed with commercially available dye formulations. However, in a preferred method of using the thickener of the invention, a thickener which contains only component (A), together with a thickener which contains only component (B), may be mixed with the dye formulation. Suitable for use in printing pastes for direct printing are in particular the formulations of water-insoluble or sparingly soluble vat or, preferably, disperse dyes, which have a low content of electrolytes and are described e.g. in German Offenlegungsschrift 2 850 482. However, salt-containing commercial formulations of reactive, acid and/or mordant dyes may also be employed, provided any losses in viscosity caused by the electrolytes is compensated for by increasing the amount of thickener in the printing paste.

If the printing pastes are used for transfer printing, the dyes suitable for use in the formulations are the conventional sublimable disperse dyes which are suitable for the heat transfer printing process and which are converted into the vapour state in the temperature range from about 160° to 220° C., i.e. dyes which have a vapour pressure higher than $10^{-5}$ at e.g. 200° C. These dyes belong to, among others, the class of the nitro dyes of the aniline series, of the azo dyes of the benzene series, and of the anthraquinone, quinoline, pyrazolone, triazole, pyridone or styryl dyes.

The dyes suitable for use in the formulations are described in the Colour Index, 3rd Edition 1971, under the headings "Reactive dyes", "Acid dyes", "Mordant dyes", "Vat dyes" and "Disperse dyes".

In addition to containing the dye formulations and the structurally viscous thickeners, the printing pastes may optionally contain conventional ingredients such as binders, deaerators or antifoams, solvents, emulsifiers and regulators. For dyeing and printing fibre materials by direct printing, binders and deaerators or antifoams are optional components of the printing pastes. But if the printing pastes are used for printing supports and fibre materials in transfer printing, then binders and deaerators or antifoams are always used as additional components of the printing paste.

Suitable binders are film-forming commercially available polymers, e.g. copolymers of acrylates and vinyl acetates which are preferably used as emulsions, or, in particular, cellulose derivatives which are in the form of aqueous, clear, i.e. gel-free, solutions, which contain hydroxyethyl cellulose or methyl cellulose as active ingredients. However, preferred active ingredients of the binders are vinyl polymers, e.g. polyvinyl acetates which have been hydrolysed to polyvinyl alcohols. Preferred polyvinyl alcohols are those having a molecular weight in the range from $1 \cdot 10^5$ to $3 \cdot 10^5$ and a degree of hydrolysis of 80 to 90 mole %, preferably 85 to 90 mole %, and which are preferably employed in the form of aqueous, dilute solutions having an active ingredient concentration of about 10 to 30% by weight.

Useful deaerators or antifoams, solvents and emulsifiers in the printing pastes are those specified above as optional components of the thickener.

Preferred deaerators in printing pastes for transfer printing are those which contain as active ingredients an octanol or mixture thereof with mixtures of high boiling hydrocarbons and contain the above specified amount of silicone oil, and which may be in the form of an aqueous composition, which composition additionally contains as surfactant an adduct of ethylene oxide and an alkylphenol having 6 to 12 carbon atoms in the alkyl moiety.

Typical examples of such deaerators are an aqueous composition which comprises 10 to 15% by weight of 2-ethyl-n-hexanol,
5 to 10% by weight of a silicone oil,
15 to 25% by weight of an adduct of 2 to 9 moles of ethylene oxide and 1 mole of p-nonylphenol, and
50 to 70% by weight of water; or, preferably, a non-aqueous mixture comprising
67 to 89% by weight of 2-ethyl-n-hexanol,
10 to 30% by weight of a mixture of hydrocarbons having a boiling range from 300° to 500° C., and
1 to 3% by weight of a silicone oil.

Particularly preferred optional components of printing pastes both for transfer printing and direct printing are white spirit as solvent and adducts of alkylene oxide and fatty alcohols, e.g. adducts of ethylene oxide and oleyl alcohol, as oil-in-water emulsifiers. Further suitable optional components in printing pastes are inorganic regulators, e.g. mineral salts such as sodium chloride, sodium sulfate, sodium hydrogen sulfate, sodium carbonate, mono-, di- or trisodium phosphate, or also conventional regulators such as sugar, dextrin and, in particular, urea. Preferred printing pastes, which contain a water-insoluble solvent, are usually in the form of structurally viscous oil-in-water emulsions.

Preferred structurally viscous printing pastes comprise
0.1 to 15% by weight of a dye formulation,
1 to 25% by weight of a thickener,
0 to 20% by weight of a binder,
0 to 5% by weight of an antifoam,
0 to 20% by weight of a water-insoluble solvent,
0 to 0.5% by weight of emulsifier and
14.5 to 98.9% by weight of water.

Printing pastes for transfer printing preferably comprise
0.1 to 15% by weight of a dye formulation,
5 to 25% by weight of a thickener,
3 to 5% by weight of a binder,
0.5 to 1% by weight of an antifoam,
0 to 20% by weight of a water-insoluble solvent,
0 to 0.5% by weight of emulsifier and
33.5 to 91.4% by weight of water.

Printing pastes for direct printing preferably comprise
0.1 to 15% by weight of a dye formulation,
1 to 25% by weight of a thickener,
0 to 5% by weight of a binder,
0 to 1% by weight of an antifoam,
0 to 20% by weight of a water-insoluble solvent,
0 to 0.5% by weight of emulsifier and
33.5 to 98.9% by weight of water.

If the thickener is in its preferred formulation as a water-in-oil emulsion, then preferably 3 to 25% by weight of this thickener is used in the printing paste. It is preferred to use 3 to 15% by weight, most preferably 5 to 12% by weight, of the emulsified thickener in the printing paste when using the preferred dye formulations of the indicated kind which have a low electrolyte content. Larger amounts of emulsified thickener, e.g. up to 25% by weight, are preferably used when using dye formulations which contain electrolytes. Before being used in the printing pastes, preferred water-in-oil emulsions of the thickener are premixed with the water employed for preparing the printing paste in order to effect a phase inversion of water-in-oil to oil-in-water in stock formulations, i.e. in the stock thickeners.

When printing fibre materials with the printing pastes of the kind referred to above which contain the thickener of the invention, the printing paste is applied to the entire surface, or preferably to parts thereof, direct or to a support for use in the transfer printing process, preferably using printing machines of conventional construction, e.g. roller printing, rotary screen printing and flat screen printing machines.

The support employed in the transfer printing process is conveniently a flexible, preferably three-dimensionally stable web, a strip or a sheet with advantageously a smooth surface, all of which are heat-stable and inert, i.e. which have no affinity for the different components of the printing paste, and consist of a wide variety of materials, e.g. metal such as an aluminium or steel sheet, plastic, paper or textile structures which may be coated, if desired, with a film of vinyl resin, ethyl cellulose or polyurethane resin. It is convenient to use sheets of aluminium or, on account of its low production costs, preferably paper.

After it has been printed, the fibre material is finished by the conventional methods. In the direct printing process, the fibre material is dried in the temperature range up to 150° C., preferably in the range from 80° to 120° C., after it has been printed. The dyes are then fixed on the material. This fixation is effected by subjecting the material to a heat treatment in the temperature range of preferably 100° to 220° C., if desired while applying overpressure. This heat treatment may be carried out either in the absence of moisture with hot air under atmospheric pressure, e.g. in the temperature range from 180° to 220° C. or, in particular, with steam. The heat treatment with steam is carried out usually with saturated steam e.g. in the temperature range from 100° to 140° C., optionally under pressure, or with superheated steam in the temperature range from about 150° to 200° C. under atmospheric pressure.

Especially where fixation of the dyes on the material is incomplete, it is advantageous to give the material a washing-off in the presence of a surfactant and/or to subject it to a reductive aftertreatment in order to be able to remove non-fixed dye in the form of its decomposition products more thoroughly by means of a subsequent washing operation, which is normally effected by rinsing the material cold, then hot, and again cold.

This washing-off and/or reductive aftertreatment is usually carried out in the temperature range from 30° to 90° C., preferably from 50° to 70° C., over about 2 to 30 minutes. Suitable surfactants are e.g. adducts of alkylene oxide and alkylphenols. Suitable reducing agents are, in particular, sulfites, sulfoxylates and, preferably, dithionites, preferably in the form of their alkali metal salts, especially their sodium salts. Normally a concentration of 1 to 6 g/l of surfactant or reducing agent suffices in the aqueous aftertreatment solution. It is preferred to carry out the aftertreatment under neutral to alkaline conditions. It is also possible to carry out an aftertreatment of the printed fibre material with a preferably halogenated solvent, e.g. perchloroethylene, in the preferred temperature range from 20° to 50° C.

In the transfer printing process, on the other hand, it is preferable to dry the support in the temperature range from 80° to 140° C., especially from 100° to 120° C., over about 5 to 20 seconds. For dyeing and printing the fibre material, the support is subsequently brought into contact with the material and, e.g. in an ironing press or calender, subjected under pressure to a heat treatment in the range from 120° to 220° C., preferably from 190° to 220° C. and, most preferably, from 190° to 210° C., for 5 to 90, preferably 20 to 90, most preferably 20 to 60, seconds, whereupon the dye transfers from the support to the fibre material.

When the heat treatment is finished, the printed fibre material is separated from the support. Usually the printed fibre material does not require an aftertreatment, i.e. neither a steam treatment to fix the dye nor a washing-off to improve the fastness properties.

The fibre materials to be printed are usually textiles, preferably planar structures such as nonwovens, felts, in particular carpets, knits and, most particularly, wovens. Suitable textiles are those made of regenerated fibres and, in particular, man-made fibres, or, if the material is dyed and printed by direct printing, also textiles made of natural fibres. Blends of these fibres are also suitable. The regenerated fibres are mainly regenerated cellulose fibres, e.g. viscose fibres and, in particular, acetate fibres (2½-acetate and triacetate), while man-made fibres are mainly acrylic, polyamide and, in particular, polyester fibres. As the regenerated and, in particular, man-made fibres of the indicated kind may be printed and dyed both by transfer printing and by direct printing, they are preferred to natural fibres. Natural fibres to be dyed by direct printing are mainly keratin fibres, e.g. silk and preferably wool fibres, or cellulose fibres, e.g. cotton fibres. Wool and, in particular, cotton fabric, and especially blends of polyester and cotton or, preferably, of polyester and wool, are particularly suitable for being printed by direct printing in the process of this invention. Blends of triacetate and polyamide are suitable for being printed by the process of this invention both by transfer printing and direct printing. Preferred fabrics, however, are man-made acrylic, triacetate or, in particular, polyester fabrics or blends thereof, or, most particularly, pure acrylic or especially pure polyester fabrics.

The use of the mixture of components (A) and (B) of the above indicated kind in the thickener of the present invention affords the following unexpected advantages when used in the printing pastes prepared therefrom:

good resistance of the printing paste, as mentioned at the outset, to severe and long-acting shear forces good definition of the patterns obtained on the textile material and, where such is used, on the support, when these are pattern printed with the printing paste good penetration of the printing paste into the textile material in direct printing good crockfastness and storage stability of the support used in transfer printing good transferability of the dyes in the printing paste from the support to the textile material in transfer printing level patterns with exceedingly sharp contours on the textile material when pattern printed with the printing paste good stirrability and pumpability of the printing pastes and good ductility of highly concentrated stock formulations of the thickener owing to its relatively low flow index relatively low sensitivity to electrolytes, permitting the use both of salt-containing dye formulations for printing natural fibres, and of dye formulations with a low content of electrolytes for printing man-made fibres possibility of influencing the definition and penetration by varying the weight ratios of components (A) and (B)

good handle on the printed textile material resulting from transfer printing or from the small amount of thickener made possible in direct printing, and good washing off properties.

The invention is illustrated by the following Examples, in which percentages are by weight.

EXAMPLE 1

A polyester woven fabric is pattern printed by film screen printing with a structurally viscous oil-in-water printing paste which contains 15 g/kg of a dispersed commercial formulation, with low electrolyte content, of the red disperse dye of the formula

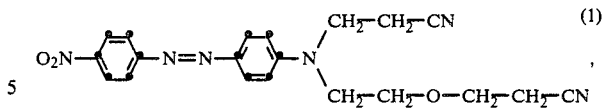

50 g/kg of a water-in-oil emulsion of a thickener comprising
20.0% of a copolymer of 1 mole of acrylic acid and 1 mole of acrylamide, crosslinked with triallyl isocyanurate and having a molecular weight of 2 to 3 million,
3.0% of a polyacrylic acid having a molecular weight of 700,000 to 900,000,
1.4% of a water-in-oil emulsifier (sorbitan monooleate),
3.6% of an oil-in-water emulsifier (2:1 mixture of an ethanolamine of fatty acids and an adduct of sorbitan monooleate and 80 moles of ethylene oxide),
18.8% of paraffin oil (boiling range: 188°–206° C., flash point: 60° C.),
45.8% of deonised water,
0.4% of a high boiling mixture of hydrocarbons as deaerator (boiling range: 270°–300° C., flash point: about 160° C.),
7.0% of a 30% aqueous solution of sodium hydroxide. and
935 g/kg of deionised water.

The paste has a pH of 6.3 and an apparent viscosity of 17,000 mPa·S (measured in a Brookfield viscosimeter RVT with spindle 6 at 20° C. and 20 rpm).

The printed fabric is dried at 100° C. and then subjected to a heat treatment with superheated stream at 180° C. for 6 minutes and then to a reductive aftertreatment for 10 minutes at 60° C. with an aqueous solution containing 4 g/l of sodium dithionite and 4 g/l of an aqueous solution of sodium hydroxide, and finally rinsed hot and cold and then dried.

The strong, accurately reproduced red print on a white ground obtained, has excellent levelness, definition and fastness properties (lightfastness, wetfastness and crockfastness). In addition, the printed fabric has a soft handle.

EXAMPLE 2

A triacetate fabric is pattern printed by film screen printing with a structurally viscous oil-in-water printing paste which contains
40 g/kg of a dispersed commerical formulation, with low electrolyte content, of the blue disperse dye of the formula

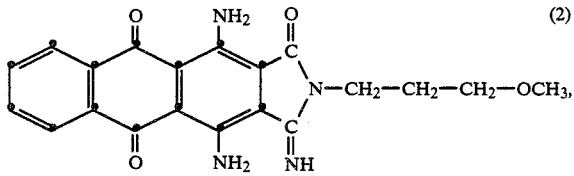

50 g/kg of the thickener of Example 1, and
910 g/kg of deionised water.

The paste has a pH of 6.3 and an apparent viscosity of 15,200 mPa·S, measured in accordance with Example 1.

The printed fabric is dried at 100° C. and then subjected to a heat treatment with superheated steam for 7 minutes at 190° C. The subsequent reductive aftertreatment, rinsing and drying are carried out as described in Example 1.

The resultant strong, brilliant, accurately reproduced blue print on a white ground has good levelness and definition and good fastness properties. In addition, the fabric has a soft handle.

EXAMPLE 3

A polyester/wool blend (85:15) is pattern printed by film screen printing with a structurally viscous oil-in-water printing paste which contains 30 g/kg of a dispersed commerical formulation, with low electrolyte content, of the yellow disperse dye of the formula

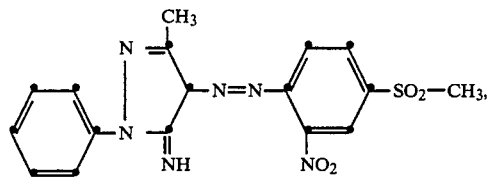

10 g/kg of a salt-containing commerical formulation of the yellow reactive dye of the formula

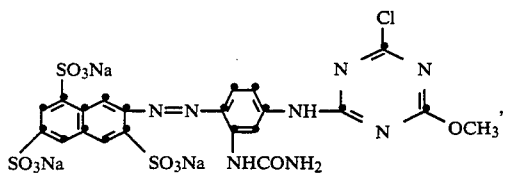

80 g/kg of a water-in-oil emulsion of a thickener comprising
  20.3% of the acrylic acid/acrylamide copolymer of Example 1,
  2.8% of the polyacrylic acid of Example 1,
  1.3% of sorbitan monooleate,
  3.6% of a 2.2:1 mixture of a fatty acid ethanolamide and an adduct of sorbitan monooleate and 80 moles of ethylene oxide,
  18.6% of the paraffin oil of Example 1,
  46.1% of deionised water,
  0.4% of the deaerator of Example 1 and
  6.9% of a 30% aqueous solution of sodium hydroxide, and
880 g/kg of water.

The paste has a pH of 6.2 and an apparent viscosity of 13,500 mPa·S, measured in accordance with Example 1.

The printed fabric is dried at 90° C. and then subjected to a heat treatment with superheated steam for 8 minutes at 175° C. The fabric is subsequently rinsed cold and given a washing-off for 10 minutes at 60° C. with an aqueous solution of a non-ionic surfactant, which contains 4 kg/l of an adduct of p-nonylphenol and 9 moles of ethylene oxide, and finally dried. The resultant strong, accurately reproduced yellow print on a white ground has good levelness and definition and good fastness properties. In addition, the printed fabric has a soft handle.

EXAMPLE 4

A polyester fabric is pattern printed by film screen printing with a structurally viscous oil-in-water printing paste which contains 30 g/kg of a dispersed commercial formulation, with low electrolyte content, of the violet disperse dye of the formula

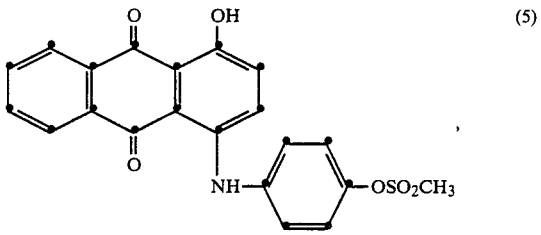

50 g/kg of the thickener of Example 1, and
920 g/kg of deionised water.

The paste has a pH of 6.2 and an apparent viscosity of 15,800 mPa·S, measured in accordance with Example 1.

The printed fabric is dried at 100° C. and then subjected to a heat treatment with superheated steam for 8 minutes at 175° C. and then given a washing-off with perchloroethylene at 35° C. for 10 minutes. The resultant strong, accurately reproduced violet print on a white ground has excellent levelness, good definition and good fastness properties. In addition, the printed fabric has a soft handle.

EXAMPLE 5

A polyester/cotton blend (80:20) is pattern printed by film screen printing with a structurally viscous oil-in-water printing paste which contains 3.5 g/kg of a dispersed commercial formulation, with low electrolyte content, of the scarlet disperse dye of the formula

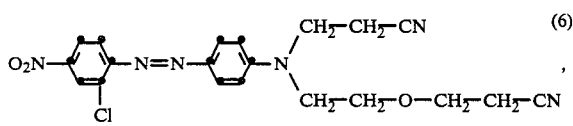

50 g/kg of the thickener of Example 1, and
947.5 g/kg of deionised water.

The paste has a pH of 6.3 and an apparent viscosity of 17,500 mPa·S, measured in accordance with Example 1.

The printed fabric is dried at 100° C. and then subjected to a heat treatment with saturated steam at 130° C. and a pressure of 2 bar for 20 minutes, and subsequently rinsed cold. The printed fabric is then given a reductive aftertreatment as described in Example 1, and dried. The resultant scarlet print has good definition and levelness and good fastness properties. In addition, the printed fabric has a soft handle.

EXAMPLE 6

A paper support is pattern printed with a structurally viscous oil-in-water printing paste which contains 100 g/kg of a dispersed commercial formulation, with low electrolyte content, of the red disperse dye of the formula

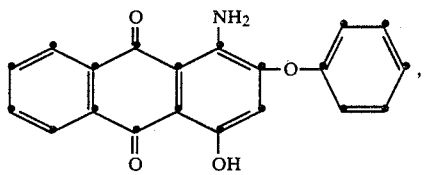

40 g/kg of the thickener of Example 1,
150 g/kg of a binder in the form of a 20% aqueous solution of a polyvinyl acetate which has been hydrolysed to a polyvinyl alcohol and which has a molecular weight of about 20,000, a degree of hydrolysis of about 88 mole %, an ester number of about 140, a residual acetyl content of about 15% and a degree of polymerisation of about 530,
5 g/kg of a deaerator in the form of a mixture comprising
80% of 2-ethyl-n-hexanol,
18% of a mixture of hydrocarbons consisting of 63% of paraffins, 29% of naphthenes and 8% of aromatics, which mixture has a boiling range of of 340°–470° C. and a flash point of about 200° C.,
2% of a silicone oil, and
705 g/kg of deionised water.

The paste has a pH of 6.1 and a viscosity of 13,500 mPa·S, measured in accordance with Example 1.

The printed support is dried for 8 seconds at 100° C. It is storable and crockfast.

The printed side of the support is then brought into contact with a polyester fabric having a mass per unit area of 100 g/m², then support and fabric are pressed together for 30 seconds at 210° C. in a calender, whereupon the dye transfers to the fabric. An accurately reproduced red print with sharp contours on a white ground and having good definition and levelness and good fastness properties is obtained on the polyester fabric, which has a soft handle.

EXAMPLE 7

A triacetate/polyamide blend (75:25) is pattern printed by film screen printing with a structurally viscous oil-in-water printing paste which contains
30 g/kg of a dispersed commercial formulation, with low electrolyte content, of the blue disperse dye of the formula (2)
40 g/kg of a water-in-oil emulsion of a thickener comprising
18.75% of the acrylic acid/acrylamide copolymer of Example 1
3.75% of the polyacrylic acid of Example 1,
1.63% of sorbitan monooleate,
3.75% of a 1.5:1 mixture of a fatty acid alkanolamide and an adduct of sorbitan monooleate and 80 moles of ethylene oxide,
19.50% of the paraffin oil of Example 1,
45.12% of deionised water,
0.50% of the deaerator of Example 1 and
7.00% of a 30% aqueous solution of sodium hydroxide,
2 g/kg of an adduct of oleyl alcohol and 80 moles of ethylene oxide,
200 g/kg of white spirit,
50 g/kg of urea, and
678 g/kg of deionised water.

The paste has a pH of 6.4 and an apparent viscosity of 15,000 mPa·S measured in accordance with Example 1.

The printed fabric is dried at 100° C. and then subjected to a heat treatment in a press with heatable plates for 60 seconds at 210° C. The fabric is subsequently rinsed cold and given a washing-off for 10 minutes at 60° C. with an aqueous solution of a non-ionic surfactant, which contains 4 kg/l of an adduct of p-nonylphenol and 9 moles of ethylene oxide, again rinsed cold and finally dried. The resultant strong, accurately reproduced blue print on a white ground has good levelness and definition and good fastness properties. In addition, the printed fabric has a soft handle.

EXAMPLE 8

A polyester/cotton blend (67:33) is pattern printed with a structurally viscous oil-in-water printing paste which contains
2 g/kg of a dispersed commercial formulation, with low electrolyte content, of the pink disperse dye of the formula

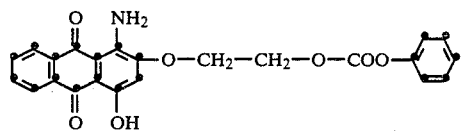

50 g/kg of the thickener of Example 1, and
948 g/kg of deionised water.

The paste has a pH of 6.2 and an apparent viscosity of 18,000 mPa·S, measured in accordance with Example 1.

The printed fabric is dried at 100° C. and then subjected to a heat treatment with hot air for 1 minute at 210° C. The resultant pink print on a white ground has good levelness and definition and good fastness properties. In addition, the printed fabric has a soft handle.

EXAMPLE 9

A paper support is pattern printed with a structurally viscous oil-in-water printing paste which contains
100 g/kg of a dispersed commercial formulation, with low electrolyte content, of the blue disperse dye of the formula

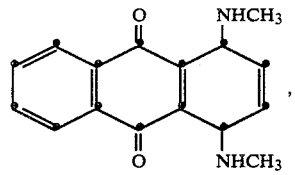

40 g/kg of the thickener of Example 1,
25 of the binder of Example 6,
5 g/kg of the deaerator of Example 6 and
830 g/kg of deionised water.

The paste has a pH of 6.3 and an apparent viscosity of 12,000 mPa·S, measured in accordance with Example 1.

The printed support is dried for 8 seconds at 120° C. It is storable and crockfast. The printed side of the support is then brought into contact with an acrylic fabric and both support and fabric are pressed together for 30 seconds at 210° C. in a calender, whereupon the dye transfers to the fabric. The strong blue, accurately reproduced print with sharp contours on a white ground obtained on the acrylic fabric, which has a soft handle, has good definition and levelness and good fastness properties.

EXAMPLE 10

A polyester is pattern printed by film screen printing with a structurally viscous oil-in-water printing paste which contains 15 g/kg of a dispersed commercial formulation, with low electrolyte content, of the red disperse dye of the formula (1), 40 g/kg of a water-in-oil emulsion of a thickener comprising
- 25.0% of a copolymer of 1 mole of acrylic acid and 1 mole of acrylamide, crosslinked with triallyl isocyanurate and having a molecular weight of 2 to 3 million,
- 0.5% of a water-in-oil emulsifier (sorbitan monooleate),
- 3.0% of an oil-in-water emulsifier (ethanolamide of fatty acids),
- 16.0% of paraffin oil (boiling range: 188°–206° C., flash point: 60° C.)
- 48.8% of deionised water,
- 6.7% of a 30% aqueous solution of sodium hydroxide, 10 g/kg of a water-in-oil emulsion of a thickener comprising
- 15.0% of a polyacrylic acid having a molecular weight of 700,000 to 900,000,
- 5.0% of a water-in-oil emulsifier (sorbitan monooleate),
- 6.0% of an oil-in-water emulsifier (adduct of sorbitan monooleate and 80 moles of ethylene oxide),
- 30.0% of paraffin oil (boiling range: 188°–206° C., flash point: 60° C.),
- 34.0% of deionised water,
- 2.0% of a high boiling mixture of hydrocarbons as deaerator (boiling range: 270°–300° C., flash point: about 160° C.),
- 8.0% of a 30% aqueous solution of sodium hydroxide, and 935 g/kg of deionised water.

The paste has a pH of 6.2 and an apparent viscosity of 17,500 mPa·S, measured in accordance with Example 1.

The printed fabric is dried at 100° C. and then subjected to a heat treatment with superheated steam at 180° C. for 8 minutes and then to a reductive aftertreatment for 15 minutes at 60° C. with an aqueous solution containing 3 g/l of sodium dithionite and 3 g/l of a 30% aqueous solution of sodium hydroxide, and finally rinsed hot and cold and then dried.

The strong, accurately reproduced red print on a white ground obtained has excellent levelness and definition and good fastness properties, and the printed fabric has a soft handle.

EXAMPLE 11

A printing paste consisting of 40 g/kg of a dispersed commercial formulation, with low electrolyte content, of the navy blue disperse dye of the formula

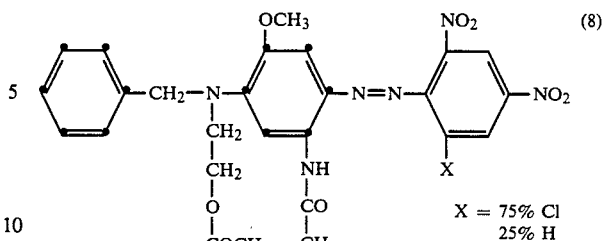

4.12 g/kg of the water-in-oil emulsion of Example 10 which contains the 25% copolymer of acrylic acid and acrylamide as thickener, 45.88 g/kg of the water-in-oil emulsion which contains the 15% polyacrylic acid thickener, and 910 g/kg of deionised water, is adjusted to pH 6.7 with a 30% solution of sodium hydroxide. The structurally viscous oil-in-water printing paste, which has an apparent viscosity of 5500 mPa·S, measured in accordance with Example 1, is pattern printed on a polyester fabric by film screen printing.

The printed fabric is dried at 100° C. and then subjected to a heat treatment with superheated steam at 180° C. for 8 minutes and then, after a rinse with cold water, to a reductive after-treatment for 10 minutes at 60° C. with an aqueous solution containing 4 g/l of sodium dithionite and 4 g/l of a 30% aqueous solution of sodium hydroxide, and finally rinsed hot and cold and then dried.

The resultant strong, accurately reproduced navy blue print on a white ground has good levelness and definition and good fastness properties (lightfastness, wetfastness and crockfastness). In addition, the fabric has a soft handle.

EXAMPLE 12

A polyester fabric is pattern printed by film screen printing with a structurally viscous, oil-in-water printing paste which contains 40 g/kg of the dye formulation of Example 11, 45 g/kg of the water-in-oil emulsion of Example 10 which contains the 25% copolymer of acrylic acid and acrylamide as thickener, 2.5 g/kg of the water-in-oil emulsion of Example 10 which contains the 15% polyacrylic acid as thickener, and 912.5 g/kg of deionised water.

The paste has a pH of 6.9 and an apparent viscosity of 21,000 mPa·S, measured in accordance with Example 1.

The printed fabric is dried, fixed and aftertreated as described in Example 1. The resultant strong, accurately reproduced navy blue print on a white ground has good levelness, definition and good fastness properties. In addition, the printed fabric has a soft handle.

What is claimed is:

1. A thickener composition which contains
   (A) a crosslinked copolymer of acrylic acid and acrylamide having a molar ratio of acrylic acid to acrylamide of 1:0.9 to 1:1.1 and a molecular weight of $1 \cdot 10^6$ to $6 \cdot 10^6$, and
   (B) a polyacrylic acid having a molecular weight of $6 \cdot 10^5$ to $1 \cdot 10^6$,
   the weight ratio of (A):(B) being 0.15:1 to 30:1.

2. A thickener according to claim 1 in which the copolymer (A) of acrylic acid and acrylamide and the polyacrylic acid (B) are structurally viscous in aqueous medium.

3. A thickener according to claim 1 which is in the form of a water-in-oil emulsion having a pH of 5.8 to 9 after being mixed with water in the ratio of 1:10 to 1:20 and containing, in addition to the polymers (A) and (B), hydrocarbons as water-insoluble solvent, alkanolamides of high molecular fatty acids, esters of polyalcohols and high molecular fatty acids and adducts thereof with an alkylene oxide as emulsifiers, ammonia, an alkanolamine or an alkali metal hydroxide as neutralizing agent and optionally an antifoam or deaerator.

4. A thickener according to claim 1 which contains
15 to 30% by weight of the polymers (A) and (B),
10 to 30% by weight of paraffin oil as solvent,
3 to 15% by weight of ethanolamides of fatty acids, sorbitan fatty acid esters and adducts thereof with ethylene oxide as emulsifiers,
5 to 10% by weight of an aqueous 25% to 35% solution of sodium hydroxide as neutralizing agent,
0 to 2% by weight of a high boiling hydrocarbon as optional deaerator and
13 to 67% by weight of water.

* * * * *